United States Patent [19]

Doernemann

[11] Patent Number: 4,989,363

[45] Date of Patent: Feb. 5, 1991

[54] BULK MATERIAL TREATMENT AND APPARATUS

[75] Inventor: Manfred Doernemann, Frankfurt, Fed. Rep. of Germany

[73] Assignee: Degesch GmbH, Frankfurt, Fed. Rep. of Germany

[21] Appl. No.: 280,850

[22] Filed: Dec. 8, 1988

[30] Foreign Application Priority Data

Dec. 11, 1987 [ZA] South Africa .................. 87/9319

[51] Int. Cl.$^5$ ............................................. A01M 13/00
[52] U.S. Cl. ........................................ 43/124; 43/132.1
[58] Field of Search .................. 43/124, 125, 131, 142, 43/143, 132.1

[56] References Cited

U.S. PATENT DOCUMENTS

| 3,513,586 | 10/1968 | Meyer et al. | 43/124 |
| 4,756,117 | 7/1988 | Friemel | 43/125 |
| 4,809,462 | 3/1989 | Maeda | 43/124 |
| 4,817,329 | 7/1989 | Forbes | 43/124 |
| 4,833,818 | 5/1989 | Berta | 43/124 |

FOREIGN PATENT DOCUMENTS

| 2922146 | 7/1980 | Fed. Rep. of Germany | 43/124 |
| 57-189628 | 11/1982 | Japan | 43/132.1 |
| 61-185145 | 8/1986 | Japan | 43/125 |
| 1191046 | 11/1985 | U.S.S.R. | 43/124 |

Primary Examiner—Richard K. Seidel
Attorney, Agent, or Firm—Millen, White & Zelano

[57] ABSTRACT

Process and apparatus for protecting or preserving stored commodities, in particular bulk commodities such as agricultural produce, e.g. grain, against deterioration by pest action, comprising the introduction into and maintenance in the commodity in a substantially gas-tight enclosure of a pesticidal atmosphere comprising carbon dioxide. The carbon dioxide is admitted to the bottom of the storage space so slowly that it spreads out as evenly as possibly in the bottom region, being mixed as little as possible with the air or like gas originally contained in the storage space and then displacing that air or gas progressively in an upward direction, to be vented to the atmosphere from the top of the space until the space is filled entirely with carbon dioxide in a predetermined concentration range. This range can be monitored and regulated automatically. Excess gas is vented through vent pipes, a slight back pressure being created by non-return flaps or throttles.

26 Claims, 2 Drawing Sheets

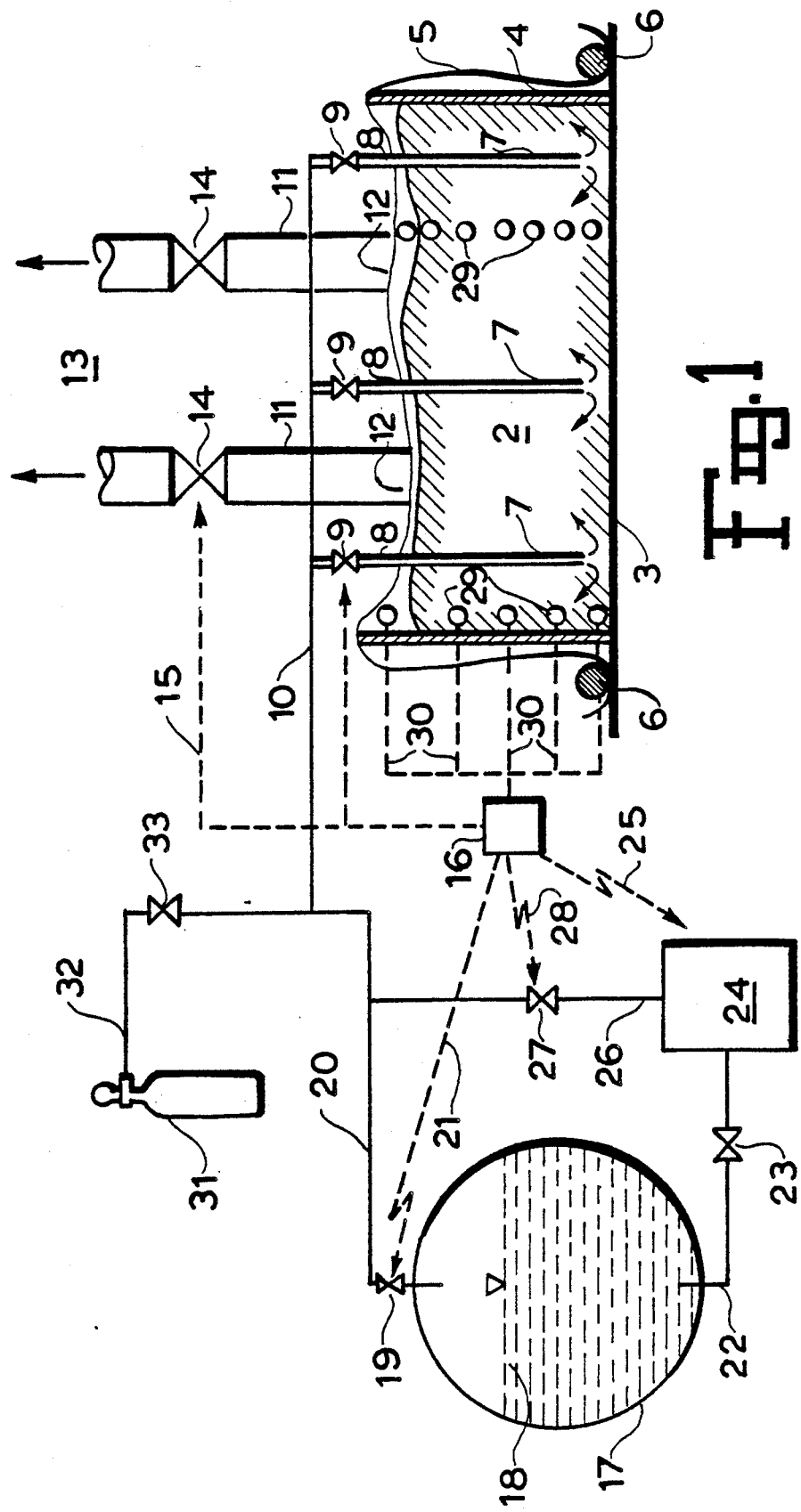

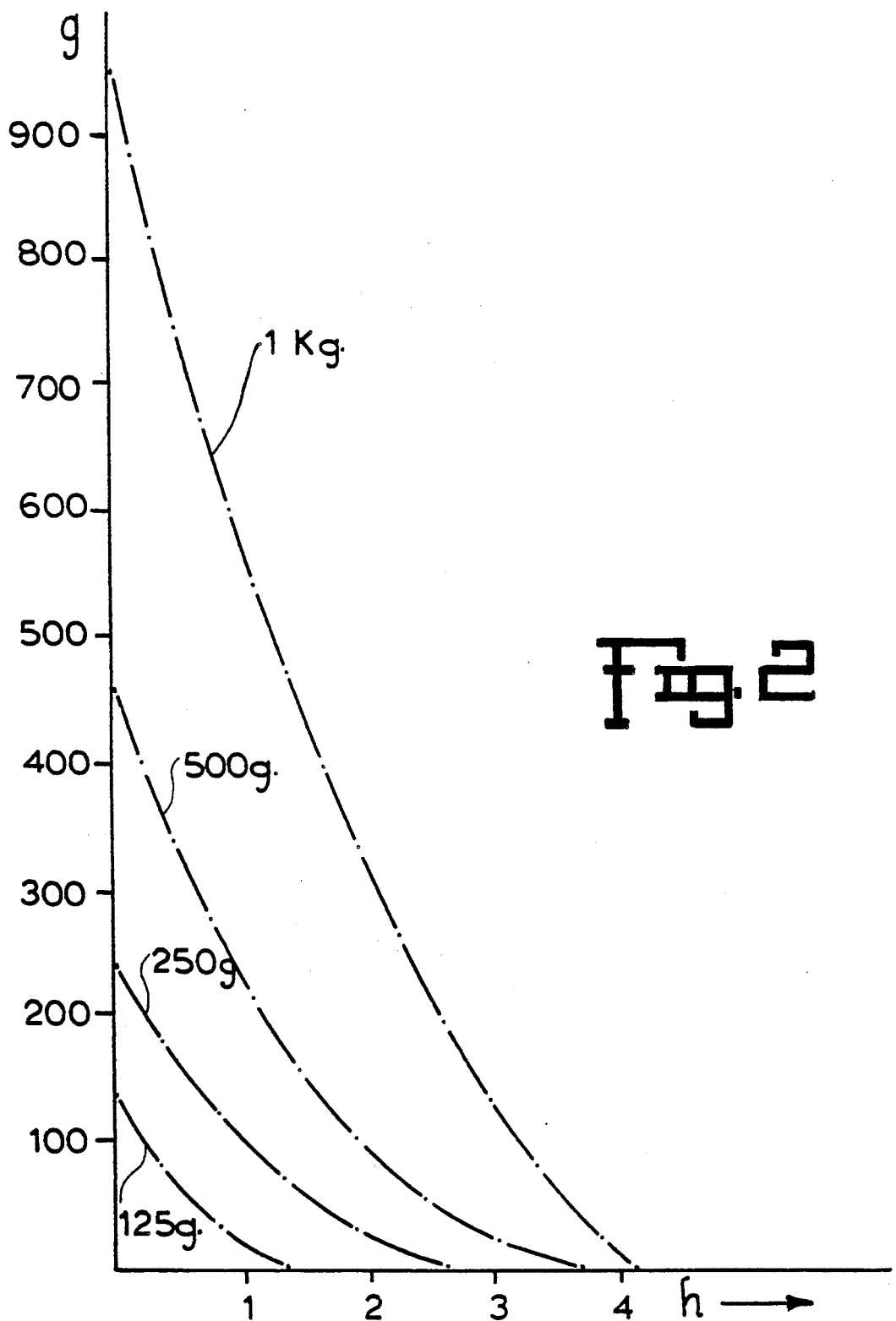

BULK MATERIAL TREATMENT AND APPARATUS

BACKGROUND OF THE INVENTION AND PRIOR ART

The present invention relates to a process for eradicating or controlling pests, respectively for protecting or preserving stored commodities, in particular bulk commodities such as agricultural produce, e.g. grain, against deterioration by pest action, comprising the introduction into and maintenance in the commodity in a substantially gas-tight enclosure of a pesticidal atmosphere comprising carbon dioxide.

It is known hat carbon dioxide above certain concentrations is toxic to pests, e.g. insects such as occur in agricultural commodities, e.g. grain. Experiments to eradicate or control pests or for protecting or preserving stored commodities, in particular bulk commodities such as agricultural produce and processed or semi-processed foodstuffs or animal feeds against deterioration by a pest action using carbon dioxide or mixtures of carbon dioxide with other either inert or pesticidal gases have been conducted in various countries. These experiments have been successful to some extent on a laboratory scale, however, various difficulties have been experienced in attempts to apply such procedures economically on a large scale.

Bulk commodities in which pests are traditionally controlled by fumigation include all kinds of grain and grain products, legumes, e.g. beans, soya beans and peas, nuts, ground nuts, cocoa beans, coffee, tobacco, but also non-edible commodities such as cotton, wool, sisal. The pests which one wishes to eradicate to control, besides higher animals such as rodents, e.g. rats and mice, include in particular a variety of insects such as bugs, weevils, moths, cockroaches as well as their eggs and larvae. The pest control procedures are applied to the commodities, when packed in bags, bales or in like containers, but also when in loose bulk form in various kinds of storage or transport facilities, including bulk storage sheds, silos, open-air plastic lined and covered dumps, railway trucks, containers and shipholds.

Traditional fumigants included methyl bromide, hydrogen cyanide, ethylene dibromide and ethylene oxide which are highly toxic and very dangerous to humans. Accordingly, alternative fumigants, in particular hydrogen phosphide, normally released at or inside the fumigation site from hydrolysable metal phosphide compositions have become far more acceptable. Phosphine leaves no residues and does not accumulate in the environment or in any parts of the biological food chain. Nevertheless, for short term environmental reasons, e.g. smell, or where there is a risk of leakage of gas into spaces occupied by humans, or where it is necessary to handle commodities immediately after treatment and before the phosphine gas has had time to dissipate, it is sometimes desirable to employ a fumigant having less toxicity than hydrogen phosphide. In such conditions particularly, the use of carbon dioxide as a fumigant would be highly desirable. To date the variations existing in the construction of commodity stores and their frequent lack of gas tightness which often can be overcome only at great cost, have militated against the commercially successful fumigation with carbon dioxide on a large scale. The technical success of carbon dioxide fumigation is dependent on the concentration of carbon dioxide maintained in the space to be fumigated and the ability to maintain such concentrations (which are very high) for the required length of time. It has been previously known (DE-OS 25 56 999) to fumigate bulk commodities, separated from the atmosphere by being covered and sealed off by a gas-tight foil. According to that prior art, relatively small containers filled with a gas or liquefied gas were set up underneath the foil and opened by special devices in order to release the required small volumes of highly poisonous gas to the enclosed space. That procedure is not suitable for the employment of carbon dioxide as a fumigating gas, because of the high concentration in which such carbon dioxides has to be employed, involving the application of large volumes to achieve the required concentration at which carbon dioxide is reliably pesticidal. It is also known (DE-PS 869 135) to introduce highly toxic fumigation gases such as cyanic acid or ethylene oxide through pipe systems equipped with nozzles and valve from the outside into spaces to be fumigated. That process as well is suitable only for the fumigation of closed spaces with gases of high toxicity which are introduced into the space in relatively small quantities. In order to be able to monitor in that context the maintenance of the desired, relatively low concentration of such highly toxic gases in a space to be fumigated and to automatically maintain the desired concentrations a monitoring and control system is disclosed in DE-PS 32 25 515.

OBJECTS AND GENERAL DESCRIPTION OF THE INVENTION

There exists a need for a process and installation permitting the reliable fumigation of closed spaces and commodities contained therein, in particular bulk materials such as agricultural commodities with large volumes of and high concentrations of carbon dioxide to permit reliably the maintenance of the required high concentration of carbon dioxide within a required range and over a required period of time.

The present invention provides a process as set out in the opening paragraph wherein gas comprising carbon dioxide in a pesticidal concentration is released to the bottom region of a space containing the commodity at a rate so slow as to substantially avoid turbulence and progressively fill the space with such gas from the bottom upwards, whilst displacing gas previously contained in the space upwards towards the top of the space and from there discharging the displaced gas, in particular air. Preferably carbon dioxide is so released from a storage vessel through duct means leading to the bottom of the space.

This process utilises the fact that the density of carbon dioxide is higher than that of air. The carbon dioxide is admitted to the bottom of the storage space so slowly that it spreads out as evenly as possibly in the bottom region, being mixed as little as possible with the air or like gas originally contained in the storage space and then displacing that air or gas progressively in an upward direction, to be vented to the atmosphere from the top of the space until the space is filled entirely with carbon dioxide in a predetermined concentration range. In this manner it is possible to introduce the required large volumes of carbon dioxide without an unacceptable pressure build-up in the space.

In particular embodiments the carbon dioxide is stored in liquid form, converted by evaporation into gas form and in such gas form is released to the bottom region of the space.

In order to achieve the desired effect it is preferred that an atmosphere of from 60 to 100% $CO_2$ is maintained in the space, e.g. for a period of from 5 to 80 days, more particularly from 7 to 60 days, e.g. about 10 to 30 days.

Depending on the nature of the pests which are to be eradicated, the temperature and the time available, it may be desirable to maintain a certain residual percentage of oxygen in the atmosphere of carbon dioxide, for example from 1 to 8%, preferably 2 to 7%, more preferably 4 to 6%, e.g. 6%. This improves the pesticidal action in many cases.

In accordance with the preferred process the carbon dioxide concentration is monitored in the space and the release of carbon dioxide to the bottom region is controlled to maintain a pesticidal concentration of carbon dioxide for a predetermined length of time. This is preferably done throughout the fumigation period, and whenever the concentration of carbon dioxide drops below a predetermined level more carbon dioxide is admitted to the bottom region of the storage space, until further monitoring shows that a desired higher concentration of carbon dioxide is attained. The admission of carbon dioxide may optionally be carried out at selected localities of a plurality of admission localities, depending on the monitoring locality at which a shortfall of carbon dioxide has been observed.

A modification of the process provides that in addition to the carbon dioxide or gas comprising carbon dioxide a further pesticidal gas is released to the space in an amount to produce an additional pesticidal effect. Such further gas may be or may comprise hydrocyanic acid or methyl bromide.

A particularly preferred such further gas is phosphine gas. The phosphine gas may be introduced from bottles or from a generator device outside the space to be fumigated through suitable pipe connections leading into the duct by means of which the carbon dioxide is introduced. The hydrogen phosphide may be generated in such generator by the hydrolysis of a suitable hydrolysable metal phosphide, e.g. aluminium phosphide, magnesium phosphide or a mixture of aluminium phosphide and magnesium phosphide. This may be done in a manner known per se, for example employing metal phosphide fumigation compositions of a type known per se. If desired or required, the pesticidal effect of the phosphine gas is enhanced by the maintenance of a concentration of oxygen in the space in a range selected in accordance with the pests which are to be eradicated. The optimum concentration of such oxygen needed to enhance the toxic effect of phosphine gas is different for different insect pests (K.P. Kashi, Pestic. Sci. 1981, 12, 111–115). Generally speaking, the concentration of oxygen is from 1 to 8% by volume, preferably from 3 to 7% by volume, more particularly at least 4%. These concentrations are similar to the ones which often enhance the action of $CO_2$.

Phosphine releasing compositions which may be of a prior art type, e.g. in the form of tablets, pellets, sachets or socalled bag blankets may also be introduced into the storage space itself through appropriate inlet means provided for that purpose. In that case the availability of adequate moisture in the commodity or in the carbon-dioxide-containing gas must be ensured so that hydrolysis and release of phosphine takes place.

The further gas may, for example, be released to the space during the second half of the period of time over which the process takes place, because in that case the further gas may serve to produce a final booster effect, to kill off any pests which may have survived the initial fumigation period. In a further modification the further gas is released to the space at a time when between 50 and 90% of the space has become occupied by the gas comprising carbon dioxide, e.g. when at least ⅔ of the space has become so occupied.

If the further gas is or comprises phosphine, there may often be attained a synergistic pesticidal effect from the combination of phosphine and carbon dioxide. The phosphine may for example be maintained in the space at a concentration of 50 to 500 ppm for a period of from 3 days to 3 weeks, more particularly at from 100 to 300 ppm, preferably at about 150 ppm.

In accordance with a particular embodiment the carbon dioxide gas is generated by the vaporisation of solid carbon dioxide (dry ice). For example the dry ice is introduced as such into the bottom region of the space, where it gradually vaporises and generates carbon dioxide gas which then expands and spreads to cause progressive filling of the space with carbon dioxide-containing gas.

According to a further aspect of the invention, there is provided a pest control installation, comprising a storage space for a commodity, sealed in a substantially gas-tight manner in relation to the atmosphere and means for supplying a gas comprising $CO_2$ in a pesticidal concentration into the space, characterised by duct means for the gas arranged to release the gas into the bottom region of the space and vent duct means adapted to release displaced gas from the top region of the space. More particularly, the vent duct means take the form of vent pipes directed upwardly from the top of the space into the atmosphere and include means for creating a back pressure in the space. A specific embodiment comprises means for creating a back pressure in the vent duct means in the form of a non-return flap responsive to light excess pressure inside the space or a throttle, optionally adjustable, for creating the back pressure.

The preferred installation also comprises sensor means for registering the carbon dioxide concentration at different localities of the space. For example, the sensor means are connected to automatically regulate the admission of carbon dioxide whenever the carbon dioxide concentration at one or more of the localities drops below predetermined level.

Although in principle it is possible to introduce the carbon dioxide by the evaporation of dry ice, in which case the carbon dioxide gas will be relatively cold (which is sometimes desired), the preferred installation according to the invention comprises a liquid carbon dioxide tank or bottle or battery of bottles, connected to a pipe or pipes leading to the duct means leading to the bottom of the region of the space and valve means for controlling the feeding of carbon dioxide from the tanks, bottle or bottles.

A more specific embodiment comprises a tank for holding liquid carbon dioxide, a pipe for withdrawing the liquid carbon dioxide leading into an evaporator for vapourising the carbon dioxide and a pipe or pipes leading from the evaporator to the duct means leading to the bottom region of the space.

If dry ice is to be used as the source of $CO_2$ gas, the installation may comprise feed duct means with gas outlet means, leading to the bottom region of the space adapted to receive solid carbon dioxide (dry ice) for gradual in situ vaporisation and release of carbon dioxide gas formed thereby into the bottom region.

As stated further above, a particular problem arises from the lack of gas-tightness of many bulk commodity storage facilities. To overcome this problem, the invention provides a gas-tight flexible foil for covering a commodity store to be disinfested and sealing the store from the atmosphere, characterised by apertures through the foil adapted for the duct(s) for the gas to pass therethrough in a sealing relationship and one or more apertures to be connected in sealing relationship to the bottom ends of upwardly directed vent duct means. In some cases it may be found that the floor of the storage facilities also requires sealing off. In such cases it will be necessary to seal the floor in a suitable manner, e.g. by the laying of a plastics foil before the store is filled with the commodity.

A specific embodiment of the installation comprises connections for connecting a source of a further pesticidal gas to the duct or ducts for releasing the gas into the bottom region of the space.

The installation may be provided in the form of a set of pre-manufactured components adapted to be assembled on site, e.g. comprising pipe sections of plastics having socket connections which can be easily plugged together, including suitable sealing means for the joints.

BRIEF DESCRIPTION OF THE DRAWINGS

In the following the invention will be further described by way of example with reference to the accompanying drawings in which FIG. 1 represents in diagrammatic vertical section and partly as a flow diagram an embodiment of an installation in accordance with the present invention.

FIG. 2 represents a graph illustrating the rate at which blocks of dry ice release $CO_2$ gas by vaporisation.

DETAILED DESCRIPTION OF SPECIFIC EMBODIMENTS

Referring to FIG. 1, a grain store generally denoted as 1 contains heaped grain 2 in bulk. The store comprises a floor 3 which if necessary, has been treated to render it gas-tight or be lined by the introduction of a plastics foil (not shown). The side walls of the store are denoted by 4 and are not necessarily gas-tight. The store is covered by a gas-tight flexible plastics sheet 5 which covers the top of the store and passes over the side walls 4 reaching down to the floor 3 where it is turned around and weighted down by sausage-like sand-filled weighting bags 6. Optionally a suitable sealing compound is applied to the area of contact between the plastics sheet 5 and the floor 3. Vertical pipes 7 assembled from premanufactured plastics pipe sections are passed at 8 in sealing relationship through the plastics sheet 5 and vertically down through the heaped grain to the bottom region of the store where the pipes are either open-ended or connected to gas-distribution manifold pipes (not shown). Near their respective tops the pipes 7 carry automatically controlled gas admission valves 9, beyond which the pipes are linked up to a common gas feed pipe 10. Vent ducts 11 are fitted in sealing relationship to matching vent apertures 12 in the top region of the plastics sheet 5 and lead to the atmosphere 13 by way of means 14 designed to maintain a slight overpressure in the storage space 1. These means 14 may take the form of a non-return flap responsive to light overpressure inside the space, i.e. adapted to open automatically when the back pressure inside the storage space exceeds a predetermined value. Alternatively, as indicated by broken line 15, the means 14 may take the form of a valve opened and closed automatically in response to signals emitted by an electronic control apparatus 16.

The feed pipe 10 is supplied with carbon dioxide gas from a carbon dioxide tank (or bottle) 17. The tank is filled with liquid carbon dioxide up to a level 18, above which a n atmosphere of gaseous carbon dioxide is maintained, from where carbon dioxide gas can be passed into feed pipe 10 directly by way of a valve 19 and a connection pipe 20. As indicated by broken line 21, the valve 19 may be operated automatically from the electronic control box 16.

In case normal evaporation inside the tank 17 is too slow, a further means of supply is provided in the form of supply pipe 22 leading through a valve 23 into an evaporator 24 comprising heating means (not shown) controlled (see line 25) from the electronic control box 16. Vapourised carbon dioxide generated in the evaporator 24 may then be passed through the supply pipe 26 and the valve 27 (again—see line 28—controlled by the electronic control box 16) to the feed pipe 10.

Various evaporators suitable for use at 24 are known and require no special description. Generally, the vaporisation of the liquid carbon dioxide results in sufficient pressure for feeding the gas into the feed ducts 7, so that no additional pressure is required.

Inside the grain store, at different localities and different levels, mostly inside the heaped grain, a plurality of carbon dioxide sensing devices 29 are provided. These are responsive to the concentration of carbon dioxide at the particular locality and each passes appropriate signals via signalling cables 30 to the electronic control apparatus 16. These signals which are indicative of the carbon dioxide concentrations at the various localities of the grain store are electronically processed to control the opening and closing of the various valves 9, 14, 19, 23 and 27 to bring about the automatic replenishment of carbon dioxide through the feed ducts 7 in response to a drop of the carbon dioxide concentration at a given locality below a predetermined level. Vice versa, the valves are operated to interrupt the feeding of carbon dioxide when the concentration at such locality rises above a predetermined level. The operation of valves 14 serves the purpose of releasing gas to the atmosphere corresponding to the volume of gas admitted through the ducts 7.

31 denotes a source of a further pesticidal gas, for example phosphine gas. In this example the source is represented by a gas bottle which through a duct 32 and a valve 33 admits gas, e.g. phosphine gas, to the feed pipe 10 and from there through the ducts 7 into the grain.

Briefly, the installation is operated as follows:

At the beginning of the fumigation gaseous carbon dioxide is admitted very slowly from the tank 17, either by way of valve 19 and feed pipe 20, or by way of the evaporator 24, via pipes and valves 22, 23, 26, 27 into the feed pipe 10 and from there, through the feed duct 7, to the bottom region of the grain 2 in the store 1. The carbon dioxide feed rate is kept so low that turbulence is avoided and that the gas emerging from the bottom ends of the feed duct 7 spreads slowly along the bottom region of the store mixing between the carbon dioxide gas so admitted and the overlying intersticial air in the grain 2 is avoided as much as possible, so that the original intersticial gas is displaced progressively upwards towards the top of the store, i.e the region immediately underneath the plastics sheet 5, and is displaced upwardly through apertures 12 and vent ducts 11 to the atmosphere 13 against a slight back pressure produced by the valve means or throttles or non-return flaps 14.

Once the sensors 29 indicate that a predetermined concentration of carbon dioxide, e.g. in excess of 70% prevails throughout the space, the electronic control box 16 automatically interrupts the further admission of carbon dioxide. The sensors 29 continue monitoring the concentration of carbon dioxide throughout the storage space, and if anywhere the carbon dioxide concentration drops below a predetermined level, e.g. below 60%—due to leakage—a signal will pass to the control box 16 which in turn will recommence the supply of carbon dioxide to the storage space. The control box 16 may be programmed to open only the valves 9 of that particular feed duct 7 which is closest to the locality where the shortfall of carbon dioxide has been detected. Once the sensors indicate that the carbon dioxide level is again above a predetemined level, e.g. above 70% throughout the grain store, the control box 16 will again shut off the supply of carbon dioxide gas.

Optionally, at a given stage of the fumigation, which may be determined either in terms of time or after the carbon dioxide level in the grain store has risen to a predetermined height, the valve 33 is operated manually or automatically to admit a further gas, in this example phosphine gas, from bottle 31 through the duct 32 and feed pipe 10 and ducts 7 into the grain. Either a calculated amount of such further gas is admitted to attain a predetermined concentration in the storage space, (e.g. determined by weighing of the bottle 31) or the phosphine gas concentration may be monitored by appropriate, e.g. electronic sensing means (not shown).

Various modifications are possible without departing from the scope and spirit of the present invention. For example, instead of passing the feed ducts into the grain through the plastics sheet from the top, the pipes could also be introduced sideways or, in suitable cases, from the bottom.

In accordance with a particular embodiment the $CO_2$-supply means and the duct 10 may be dispensed with. Instead dry ice is introduced in the form of blocks or pellets into the ducts, where in the bottom region the dry ice vaporises. In that embodiment it is advantageous for the bottom ends of the ducts 7 to be closed and instead for the walls of the ducts near the bottom to be perforated to provide the outlet means for the gas. The approximate rates at which different sizes of dry ice blocks will vaporise at average ambient temperature are apparent from FIG. 2. In FIG. 2 the ordinate represents the weight loss of the blocks in gram (g). The abscissa represents time in hours. The four curves are in respect of dry ice blocks of 125 g, 250 g, 500 g and 1 kg. It is thus possible to regulate the rate of $CO_2$ gas generation by the amount of dry ice introduced into the ducts and the size of the blocks or pellets. Obviously the dry ice may also be introduced into the duct in pellet form at a desired or regulated rate by automatic dispenser means, which may generate in response to signals derived from the probes 29.

The above detailed description when read with the preceding general description will enable the skilled addressee to practise the invention as set out in the following claims.

I claim:

1. In a process for eradicating or controlling pests in bulk commodities, respectively for protecting or preserving stored commodities, against deterioration by pest action, comprising the introduction into and maintenance in the commodity in a substantially gas-tight enclosure of a pesticidal atmosphere comprising carbon dioxide, the improvement which comprises introducing and releasing a gas comprising carbon dioxide in a pesticidal concentration in excess of about 50% by volume to the bottom region of an enclosed space containing the commodity at a rate slow enough as to substantially avoid turbulence and thereby progressively filling the space with such gas from the bottom upwards, whilst displacing gas previously contained in the space upwardly towards the top of the space and from there discharging the displaced gas.

2. Process as claimed in claim 1, wherein carbon dioxide gas is so released from a storage vessel through duct means leading to the bottom of the space.

3. Process as claimed in claim 1, wherein the carbon dioxide is stored in liquid form, converted by evaporation into gas form and in such gas form is released to the bottom region of the space.

4. Process as claimed in claim 1, wherein an atmosphere of from 60 to 100% $CO_2$ is maintained in the space.

5. Process as claimed in claim 1, wherein the carbon dioxide concentration is monitored in the space in one or more localities and the release of carbon dioxide to the bottom region is controlled to maintain a pesticidal concentration of carbon dioxide for a predetermined length of time.

6. Process as claimed in claim 1, wherein a further pesticidal gas is released to the space in an amount to produce an additional pesticidal effect.

7. Process as claimed in claim 6, wherein the further gas is hydrocyanic acid or methyl bromide.

8. Process as claimed in claim 6, wherein the further gas is phosphine gas.

9. Process as claimed in claim 8, wherein the pesticidal effect of the phosphine gas is enhanced by the maintenance of a concentration of oxygen in the space in a range selected in accordance with the pests which are to be eradicated.

10. Process as claimed in claim 1, wherein a concentration of oxygen from 1 to 8% by volume is maintained in the space.

11. The process as claimed in claim 6, wherein the further pesticidal gas is absent for an initial period corresponding to at last half the total period of time of the process beginning from the time when the pesticidal atmosphere is first admitted, until no further gas is introduced into the space, and the further gas is only released to the space after such initial period.

12. Process as claimed in claim 6, wherein the further gas is released to the space at a time when between 50 and 90% of the space has become occupied by the gas comprising carbon dioxide.

13. Process as claimed in claim 6, wherein the further gas is or comprises phosphine and phosphine is maintained in the space at a concentration of 50 to 500 ppm.

14. Process as claimed in claim 1, wherein the carbon dioxide gas is generated by the vaporisation of solid carbon dioxide (dry ice).

15. Process as claimed in claim 14, wherein the dry ice is introduced as such into the bottom region of the space, where it gradually vaporises and generates carbon dioxide gas which then expands and spreads to cause progressive filling of the space with carbon dioxide-containing gas.

16. A pest control installation, comprising a storage space for a commodity, sealed in substantially gas-tight manner in relation to the atmosphere and means for supplying a gas comprising $CO_2$ in a pesticidal concentration into the space, comprising duct and regulator means for the gas arranged to release the gas into the bottom region of the space in substantially non-turbulent manner and vent duct means adapted to release progressively displaced gas from the top region of the space, comprising means for creating a back pressure in the vent duct means, in the form of a non-return flap responsive to light excess pressure inside the space or a throttle, optionally adjustable, for creating the back pressure.

17. Installation according to claim 16, comprising connections for connecting a source of a further pesticidal gas to the duct or ducts for releasing the gas into the bottom region of the space.

18. Installation according to claim 16, in the form of a set of premanufactured components adapted to be assembled on site.

19. A pest control installation, comprising a storage space for a commodity, sealed in a substantially gas-tight manner in relation to the atmosphere and means for supplying a gas comprising $CO_2$ in a pesticidal concentration into the space, comprising duct and regulator means for the gas arranged to release the gas into the bottom region of the space in a substantially non-turbulent manner and vent duct means adapted to release progressively displaced gas from the top region of the space, comprising sensor means for registering the carbon dioxide concentration at different localities of the space.

20. Installation according to claim 19, wherein the sensor means are connected to automatically regulate the admission of carbon dioxide whenever the carbon dioxide concentration at one or more of the localities drops below a predetermined level.

21. A pest control installation, comprising a storage space for a commodity, sealed in a substantially gas-tight manner in relation to the atmosphere and means for supplying a gas comprising $CO_2$ in a pesticidal concentration into the space, comprising duct and regulator means for the gas arranged to release the gas into the bottom region of the space in a substantially non-turbulent manner and vent duct means adapted to release progressively displaced gas from the top region of the space, comprising a liquid carbon dioxide tank or bottle or battery of bottles, connected to a pipe leading to the duct leading to the bottom region of the space and valve means for controlling the feeding of carbon dioxide from the tanks, bottle or bottles.

22. A pest control installation, comprising a storage space for a commodity, sealed in a substantially gas-tight manner in relation to the atmosphere and means for supplying a gas comprising $CO_2$ in a pesticidal concentration into the space, comprising duct and regulator means for the gas into the bottom region of the space in a substantially non-turbulent manner and vent duct means adapted to release progressively displaced gas from the top region of the space, comprising a tank for holding liquid carbon dioxide, a pipe for withdrawing the liquid carbon dioxide leading to an evaporator for vaporizing the carbon dioxide and pipe or pipes leading from the evaporator to the duct means leading to the bottom region of the space.

23. A pest control installation, comprising a storage space for a commodity, sealed in substantially gas-tight manner in relation to the atmosphere and means for supplying a gas comprising $CO_2$ in a pesticidal concentration into the space, comprising duct and regulator means for the gas arranged to release the gas into the bottom region of the space in a substantially non-turbulent manner and vent duct means adapted to release progressively displaced gas from the top region of the space, comprising feed dust means with the gas outlet means, leading to the bottom region of the space adapted to receive solid carbon dioxide (dry ice) for gradual in situ vaporization and release of carbon dioxide gas formed thereby into the bottom region.

24. A pest control installation, comprising a storage space for a commodity, sealed in a substantially gas-tight manner in relation to the atmosphere and means for supplying a gas comprising $CO_2$ in a pesticidal concentration into the space, comprising duct and regulator means for the gas arranged to release the gas into the bottom region of the space in a substantially non-turbulent manner and vent duct means adapted to release progressively displaced gas from the top region of the space, including a gas tight flexible foil for covering a commodity store to be disinfested and sealing the store from the atmosphere, comprising apertures through the foil adapted for the duct means for the gas to pass therethrough in a sealing relationship to the bottom ends of upwardly directed vent duct means.

25. The installation according to claim 24, comprising connections for connecting a source of a further pesticidal gas to the duct of ducts for releasing the gas into the bottom region of the space.

26. The installation according to claim 24 wherein the installation is in the form of premanufactured components adapted to be assembled on site.

* * * * *